United States Patent [19]
Watt

[11] Patent Number: 5,675,615
[45] Date of Patent: Oct. 7, 1997

[54] APPARATUS AND METHOD FOR SWITCHING ASYNCHRONOUS CLOCK SIGNALS

[75] Inventor: Simon Charles Watt, Cambridge, United Kingdom

[73] Assignee: Advanced Risc Machines Limited, Cambridge, United Kingdom

[21] Appl. No.: 744,121

[22] Filed: Nov. 5, 1996

Related U.S. Application Data

[63] Continuation of Ser. No. 303,167, Sep. 8, 1994, abandoned.

[30] Foreign Application Priority Data

Feb. 23, 1994 [GB] United Kingdom ............... 9403462

[51] Int. Cl.$^6$ ........................................................ H04L 7/00
[52] U.S. Cl. ............... 375/354; 327/145; 395/556; 395/559; 364/270.3; 364/276.5; 340/825.2
[58] Field of Search ....................... 375/356, 357, 375/371, 354, 359; 327/141, 145, 144, 208, 99; 395/550, 551, 445, 556; 326/93, 96; 331/49; 340/825.2; 364/270.3, 270.5

[56] References Cited

U.S. PATENT DOCUMENTS

| | | | |
|---|---|---|---|
| 4,398,155 | 8/1983 | Atwell, Jr. et al. | 327/144 |
| 4,870,299 | 9/1989 | Chen | 327/99 |
| 4,965,524 | 10/1990 | Patchen | 328/72 |
| 4,970,405 | 11/1990 | Hagiwara | 327/145 |
| 5,015,871 | 5/1991 | Sirabella | 327/144 |
| 5,274,678 | 12/1993 | Ferolito et al. | 375/357 |
| 5,291,528 | 3/1994 | Vermeer | 375/354 |
| 5,315,181 | 5/1994 | Schowe | 326/93 |
| 5,371,764 | 12/1994 | Gillingham et al. | 375/354 |

FOREIGN PATENT DOCUMENTS

| | | |
|---|---|---|
| 0 242 010 A1 | 10/1987 | European Pat. Off. ........ G06F 1/100 |
| 2183621 | 7/1990 | Japan . |
| 3126114 | 5/1991 | Japan . |

OTHER PUBLICATIONS

Newton, Newton's Telecom Dictionary, pp. 89, 174–175.

*Primary Examiner*—Wellington Chin
*Assistant Examiner*—William Luther
*Attorney, Agent, or Firm*—Albert C. Smith

[57] ABSTRACT

Within a data processing system having two alternative clock signals of different frequencies (fclk, mclk) it is necessary to provide a mechanism for switching between the clock signals. When switching from the fast clock (fclk) to the slow clock (mclk), the system adopts the slow clock from the first falling edge (ffe) after a processing delay (PD) associated with the decision as to whether or not to change clocks. This processing delay can be greater than one half of a cycle of the fast clock. In contrast, when switching from the slow clock to the fast clock, the system adopts the fast clock from the first rising edge (fre) following the processing delay. Thus, a system is provided in which differing strategies for synchronization are adopted depending upon the direction of change of the clock signal.

7 Claims, 6 Drawing Sheets

APPARATUS AND METHOD FOR SWITCHING ASYNCHRONOUS CLOCK SIGNALS

RELATED APPLICATIONS

This is a continuation of application Ser. No. 08/303,167, filed on Sep. 8, 1994 now abandoned.

BACKGROUND OF THE INVENTION

1. Field of the Invention

This invention relates to the field of data processing. More particularly, this invention relates to data processing utilizing a selectable one of a first clock signal and a second clock signal, said first clock signal and said second clock signal having differing frequencies.

2. Description of the Prior Art

It is known to provide processing systems that can operate at differing clock frequencies. Typically, a fast clock signal and a slow clock signal are provided and selected between. The result of the selection is a composite clock signal which is then supplied to the processing circuitry to drive its operation. An example of such a system is shown in FIG. 1 of the accompanying drawings.

Figure 1:
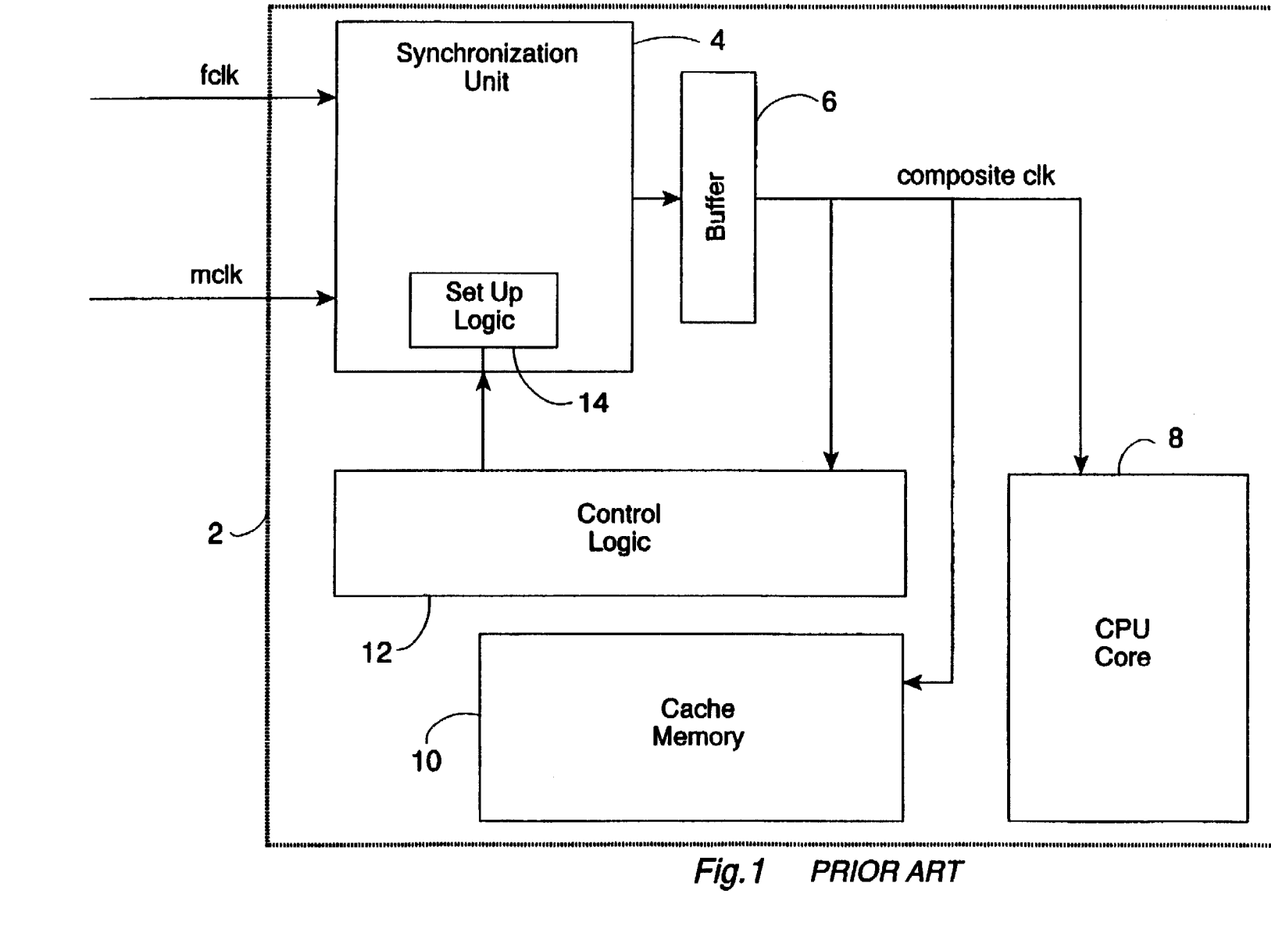
FIG. 1 schematically illustrates an integrated circuit having a clock selection mechanism.

FIG. 1 shows an integrated circuit 2 having input to it two clock signals, namely a fast clock signal (fclk) and a slower clock signal (mclk). The integrated circuit 2 will in practice have a great many other inputs and outputs, but, for the sake of clarity, these have not been shown. The fast clock signal fclk and the slow clock signal mclk are passed to a synchronization unit 4 where a selection between the two clock signals is made. The selected clock signal forms a composite clock signal that is passed through a power amplifying buffer 6 before being distributed over the clock bus of the integrated circuit 2 to drive the processing in the rest of the circuit. The integrated circuit 2 includes a central processing unit (CPU) core 8, a cache memory 10 and control logic 12.

Among the functions performed by the control logic 12 is that of determining that a switch in selected clock frequency should be made. In this example, a switch may be made from the fast clock signal fclk to the slow clock signal mclk when a cache miss occurs, resulting in a need to access off-chip memory. Such off-chip accesses are not able to proceed at as fast a rate as on-chip processing and so the slower clock mclk needs to be selected whilst this off-chip access takes place.

The control logic 12 that determines that the slower clock mclk should be selected is itself driven from the composite clock. This puts a constraint upon the system in that the control logic 12 must be able to determine and action a switch to the slow clock mclk within a half cycle of the fast clock fclk with which it is being driven. Furthermore, set up logic 14 within the synchronization unit 4 is responsive to the control logic 12 to bring about the required change in selected clock. The time that this set up logic 14 takes to operate also reduces the time available to the control logic 12. A further factor is that the power amplifying buffer 16 necessarily introduces some phase lag whereby the clock signal driving the control logic 12 is behind the fast clock signal fclk from which it is generated; this can be quite significant.

The net result of the above is that the requirement to be able to switch the selected clock frequency within a half cycle of the fast clock signal fclk limits the maximum frequency of the fast clock signal fclk. This has the follow-on effect of limiting the overall system performance. The problems associated with FIG. 1, as discussed above, are illustrated in FIGS. 2 and 3 of the accompanying drawings.

Figure 2:
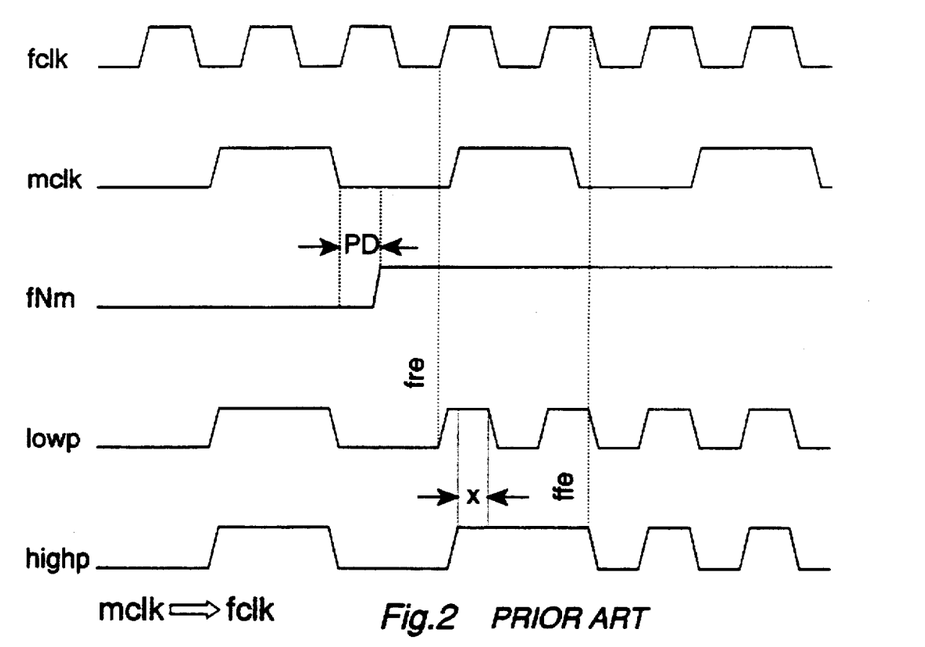
FIGS. 2 and 3 illustrate various clock switching strategies.

FIG. 2 illustrates possibilities for switching from the slow clock signal mclk to the fast clock signal fclk. The top two signal lines show respectively the fast clock signal fclk and the slow clock signal mclk, which can be asynchronous. The slow clock signal mclk is currently selected and being used to drive the circuitry of the integrated circuit 2, including the control logic 12. The falling edge of each slow clock pulse starts a determination as to whether a change of clock is required. This determination introduces a finite processing delay PD before the result is issued as a control signal fNm.

The transition of the control signal fNm from low to high indicates that the clock should change from the slow clock signal mclk to the fast clock signal fclk. The set up logic 14 and the synchronization unit 4 usually adopt the strategy illustrated in the signal line lowp. In this strategy, the first rising edge (fre) of the fast clock signal fclk occurring after a minimum delay from the preceding falling edge of the slow clock signal mclk is followed and the fast clock signal fclk thereafter adopted.

The lowest signal line highp in FIG. 2 illustrates an alternative approach. In this approach, after the processing delay PD and the issue of a high control signal fNm, the synchronization unit 4 takes the first falling edge of the fast clock signal fclk that will not cause an excessively short clock pulse to be issued. In the case illustrated, it will be seen that the composite clock rises to a high level following the determination that the switch should occur and maintains this level beyond the first falling edge of the fast clock signal fclk, since this occurs after only a time gap of x, which is too short for the integrated circuit 2 to follow. Thus, it is the second falling edge of the fast clock signal fclk that is followed as indicated by the line ffe.

It will be seen that the approach of waiting for the first falling edge illustrated in line highp suffers from the problem that the slow clock mclk is retained for a longer period of time than that obtained by following the first rising edge approach of the line lowp. Retaining the slow clock mclk longer degrades system performance.

Figure 3:
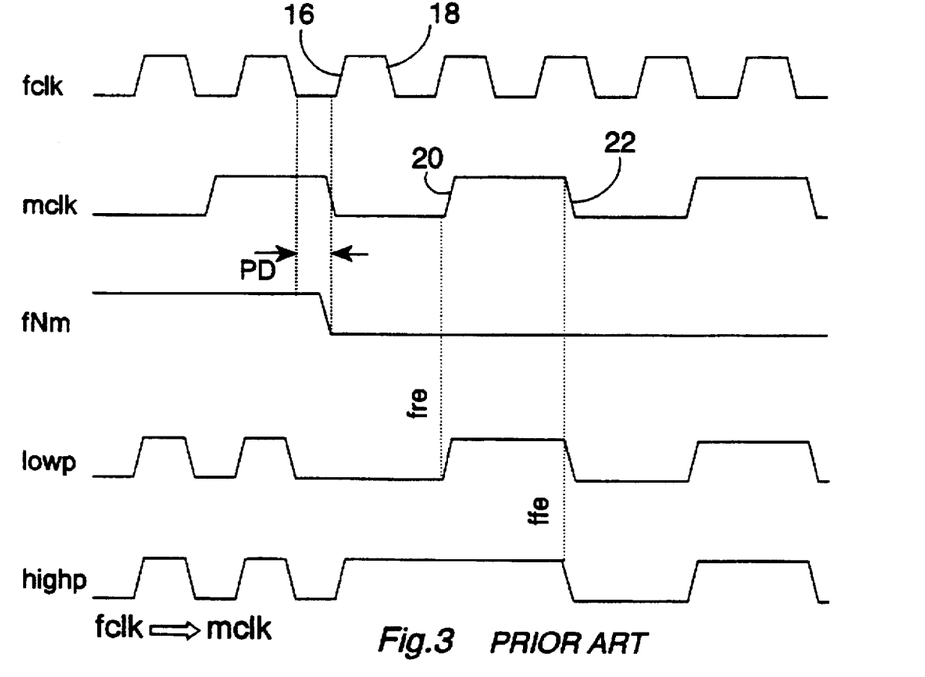

FIG. 3 illustrates the same two approaches being applied to a transition from the fast clock signal fclk to the slow clock signal mclk. In the approach of waiting for the first rising edge after the decision to change clocks, it will be seen that the processing delay PD very nearly fills a complete half cycle of the fast clock signal fclk. With this approach the frequency of the fast clock signal fclk must be constrained so as to be sure that the processing delay PD will always have expired prior to the rising edge 16 of the fast clock signal fclk. This is necessary in order that the system can determine whether to follow the rising edge 16 of the fast clock signal fclk or wait for the rising edge 20 of the slow clock signal mclk.

The lowermost signal line highp in FIG. 3 illustrates the alternative approach of taking the rising edge of the current clock regardless, then waiting for the next falling edge of the other clock. In this case, the rising edge 16 of the fast clock signal fclk is followed. Thus, the constraints on the processing delay PD are relaxed such that the control logic 12 must have determined whether a switch should occur prior to the falling edge 18 of the fast clock signal fclk so that either the falling edge 18 of the fast clock signal fclk or the falling edge 22 of the slow clock signal mclk may be followed. This effectively doubles the time available for the processing delay PD. In the case illustrated, the falling edge 22 of the slow clock signal mclk is followed. Staying at the fast clock frequency fclk for a cycle longer than is necessary is a smaller penalty than staying at the slow clock frequency mclk longer than is necessary. Furthermore, this penalty is mitigated by the increase in maximum clock frequency allowed.

SUMMARY OF THE INVENTION

An object of the present invention is to provide a clock switching mechanism with relaxed limitations on the maximum frequency of the fast clock signal and that does not unduly delay switching operations.

Viewed from one aspect, the present invention provides apparatus for processing data, said apparatus comprising:

(i) means for receiving a first clock signal changing between a first signal level and a second signal level at a first clock signal frequency;

(ii) means for receiving a second clock signal changing between said first signal level and said second signal level at a second clock signal frequency, said second clock signal frequency being lower than said first clock signal frequency;

(iii) a clock signal selecting means for performing a clock switching cycle to switch selection of a composite clock signal between said first clock signal and said second clock signal, said clock switching cycle starting from a change in said composite clock signal from said first signal level to said second signal level; and (iv) processing logic driven by said composite clock signal for controlling whether said clock signal selecting means should effect a clock switch; wherein (v) when switching from said first clock signal to said second clock signal, said composite clock signal adopts said second clock signal from a time at which said second clock signal changes from said first signal level to said second signal level; and (vi) when switching from said second clock signal to said first clock signal, said composite clock signal adopts said first clock signal from a time at which said first clock signal changes from said second signal level to said first signal level.

The invention recognizes and exploits that when switching from the fast clock to the slow clock, the requirements on the processing logic to complete its determination as to whether a switching operation should be effected are relaxed if the clock signal selecting means synchronizes to a change of the slow clock from the first signal level to the second signal level rather than a change from the second signal level to the first signal level. The invention also recognizes that a different approach should be adopted when switching from the slow clock to the fast clock in order to avoid the slow clock remaining selected for an unnecessarily long time. Thus, when switching from the slow clock to the fast clock, the clock signal selecting means synchronizes on a rising edge of the fast clock. In this way, different switching strategies are adopted depending upon the direction in which switching occurs, yielding a relaxation in the constraints on the fast clock speed without compromising the speed of switching when switching from the slow clock to the fast clock.

In preferred embodiments of the invention, when switching from said first clock signal to said second clock signal after starting said clock selecting cycle, said clock signal selecting means controls said composite clock signal to follow said first clock signal in changing from said second signal level to said first signal level prior to adopting said second clock signal.

In this way, the composite clock signal follows the currently selected first clock signal until the processing logic determines whether a switch to the second clock signal should in fact take place.

In the above circumstance, it is convenient to provide systems in which said processing logic takes a time greater than one half of a cycle of the first clock signal to determine that a clock switch should take place, whereupon a hold signal is generated by said clock signal selecting means to maintain said first signal level as said composite clock signal for a minimum time of one half of a cycle of said first clock signal.

Thus, excessively short clock pulses that would cause problems for the circuits driven by those clock pulses are avoided.

In a complementary manner, it is preferred that when switching from said second clock signal to said first clock signal after starting said clock selecting cycle, said clock signal selecting means controls said composite clock signal to maintain said second signal level until adopting said first clock signal.

Furthermore, excessively short clock pulses are avoided by providing that said clock signal selecting means controls said composite clock signal to maintain said second signal level for a minimum time of one half of a cycle of said first clock signal.

It will be appreciated that whilst the clock switching mechanism of the invention can be utilized in many differing circuits, it is particularly suited for use in situations in which said processing logic includes a central processing unit core.

In systems including a central processing unit core, the need to rapidly switch between a fast clock and a slow clock particularly occurs when said processing logic includes a cache memory, said second clock signal being adopted when a cache miss occurs causing an external memory access to be made. Other reasons for switching to the second clock signal include Translation Table walks and Read-lock-write instructions.

It will be appreciated that the first signal level and the second signal level need merely be different in order to provide a signal from which it is possible, either directly or indirectly, to clock processing logic. Furthermore, a transition between the first signal level and the second signal level may be a transition from a high voltage to a low voltage, or from a low voltage to a high voltage. However, in order to readily cooperate with other circuit elements, it is preferred that said first signal level is a high signal level and said second signal level is a low signal level.

Once the composite clock signal has emerged from the clock signal selecting means, it is typically passed to a large number of other circuit elements. Thus, the composite clock signal is distributed on a clock bus that will typically have a relatively high capacitance. In order to drive this bus without introducing excessive phase delays, it is advantageous to provide a buffer circuit for power amplifying said composite clock signal prior to supplying said composite clock signal to said processing logic.

Whilst the invention may be implemented using discrete components, the invention is particularly suited for implementation as an integrated circuit.

Viewed from another aspect, this invention provides a method of processing data, said method comprising the steps of:

(i) generating a first clock signal changing between a first signal level and a second signal level at a first clock signal frequency;

(ii) generating a second clock signal changing between said first signal level and said second signal level at a second clock signal frequency, said second clock signal frequency being lower than said first clock signal frequency;

(iii) performing a clock switching cycle to switch selection of a composite clock signal between said first clock signal and said second clock signal, said clock switching cycle starting from a change in said composite clock signal from said first signal level to said second signal level; and (iv) controlling with processing logic driven by said composite clock signal whether said clock signal selecting means should effect a clock switch; wherein (v) when switching from said first clock signal to said second clock signal, said composite clock signal adopts said second clock signal from a time at which said second clock signal changes from said first signal level to said second signal level; and (vi) when switching from said second clock signal to said first clock signal, said composite clock signal adopts said first clock signal from a time at which said first clock signal changes from said second signal level to said first signal level.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 4:
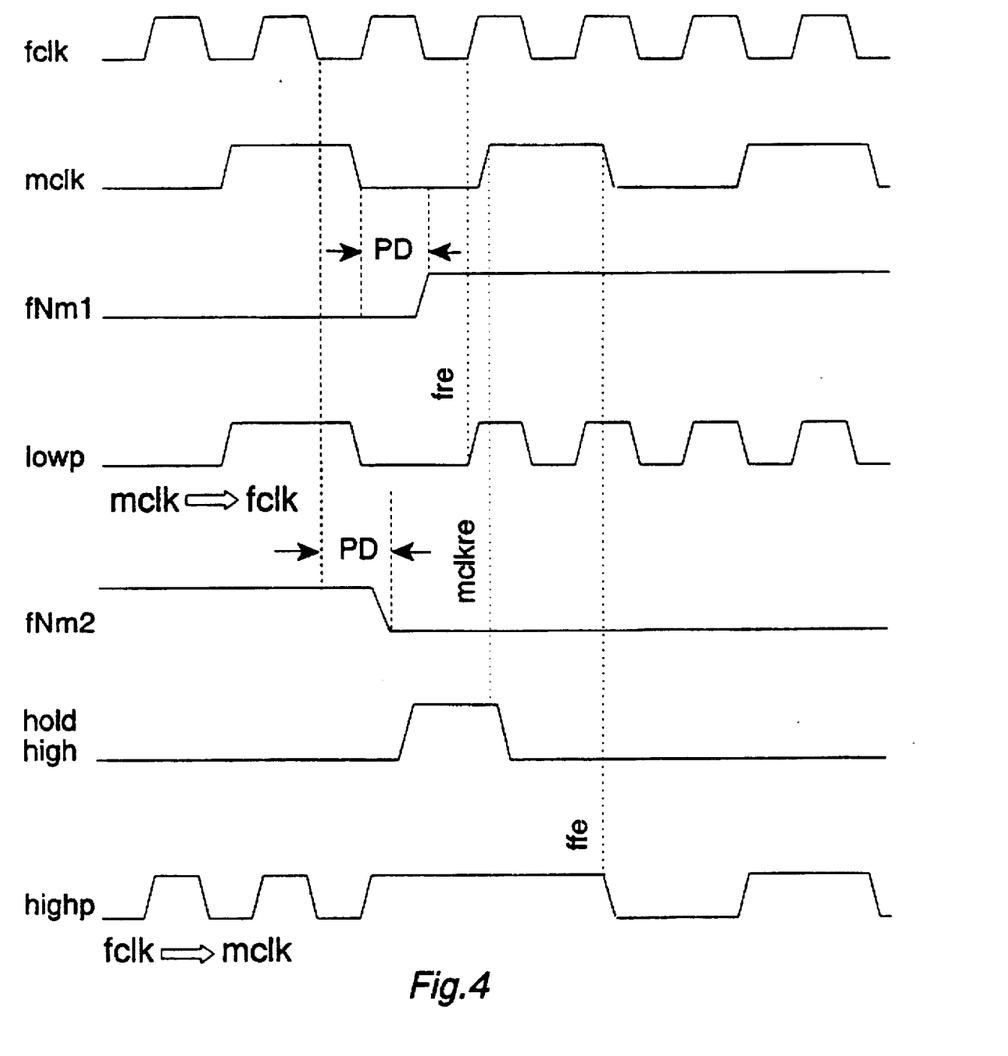
FIG. 4 illustrates a clock switching strategy in which different approaches are taken depending upon the direction of switching.

FIG. 4 illustrates a first clock signal fclk that is of a high frequency, together with a second clock signal mclk that is of a low frequency. The first clock signal fclk and the second clock signal mclk are asynchronous.

The third and fourth lines in FIG. 4 illustrate a switching operation from the second clock signal mclk to the first clock signal fclk. On the falling edge of the first pulse of the second clock signal mclk, the processing logic starts its determination as to whether a clock switching operation should occur. This processing incurs a processing delay PD as illustrated. If a clock switch should occur, then the control signal fNm1 (fast-not-memory 1) is switched from a low state to a high state. It will be noticed that the processing delay PD in FIG. 4 is greater than that in FIGS. 2 and 3 corresponding to a relaxation in the constraint upon the maximum frequency of the first clock signal fclk, although the length of the processing delay is more of a constraint when switching in the other direction from a fast clock signal to a slow clock signal.

Following the transition in the control signal fNm1 corresponding to a switch from the second clock frequency mclk to the first clock frequency fclk, the system adopts the first rising edge (fre) in the first clock signal fclk and thereafter follows the first clock signal. In this particular case, the processing delay PD is greater than half a cycle of the first clock signal fclk and so there is no possibility of an unduly short clock pulse being generated. However, the processing delay can vary and so it is desirable to provide a synchronizer to avoid unduly short clock pulses.

The lowermost three lines in FIG. 4 illustrate the switching operation from the first clock signal fclk to the second clock signal mclk. In this case, the processing logic is triggered to start its determination as to whether the switching operation should take place from the falling edge of the second pulse of the first clock signal fclk. The associated processing delay PD is greater than one half of a cycle of the first clock signal fclk. Accordingly, the composite clock signal illustrated by the line highp follows the next rising edge of the first clock signal fclk before the determination has completed.

The control signal fNm2 in this case makes a transition from high to low indicating that a switch from the first clock signal fclk to the second clock signal mclk should take place. The transition in the control signal fNm2 triggers a hold high signal to be generated that has the effect of causing the composite clock signal to be held at a high signal level until the hold high signal is released.

In order to ensure that an excessively short clock pulse is not generated, the system is arranged to release the hold high signal only after a rising edge in the second clock signal mclkre has been detected (i.e. the first valid pulse of the second clock signal mclk). Once the hold high signal has been released, the composite clock signal is then free to follow the first falling edge ffe encountered thereafter.

It will be appreciated that the operations illustrated in FIG. 4 allow a transition from a fast clock frequency to a slow clock frequency to be controlled without undue constraints upon the fast clock frequency, whilst also allowing a change from the slow clock frequency to the fast clock frequency to occur without introducing extra slow clock pulses.

Figure 5:
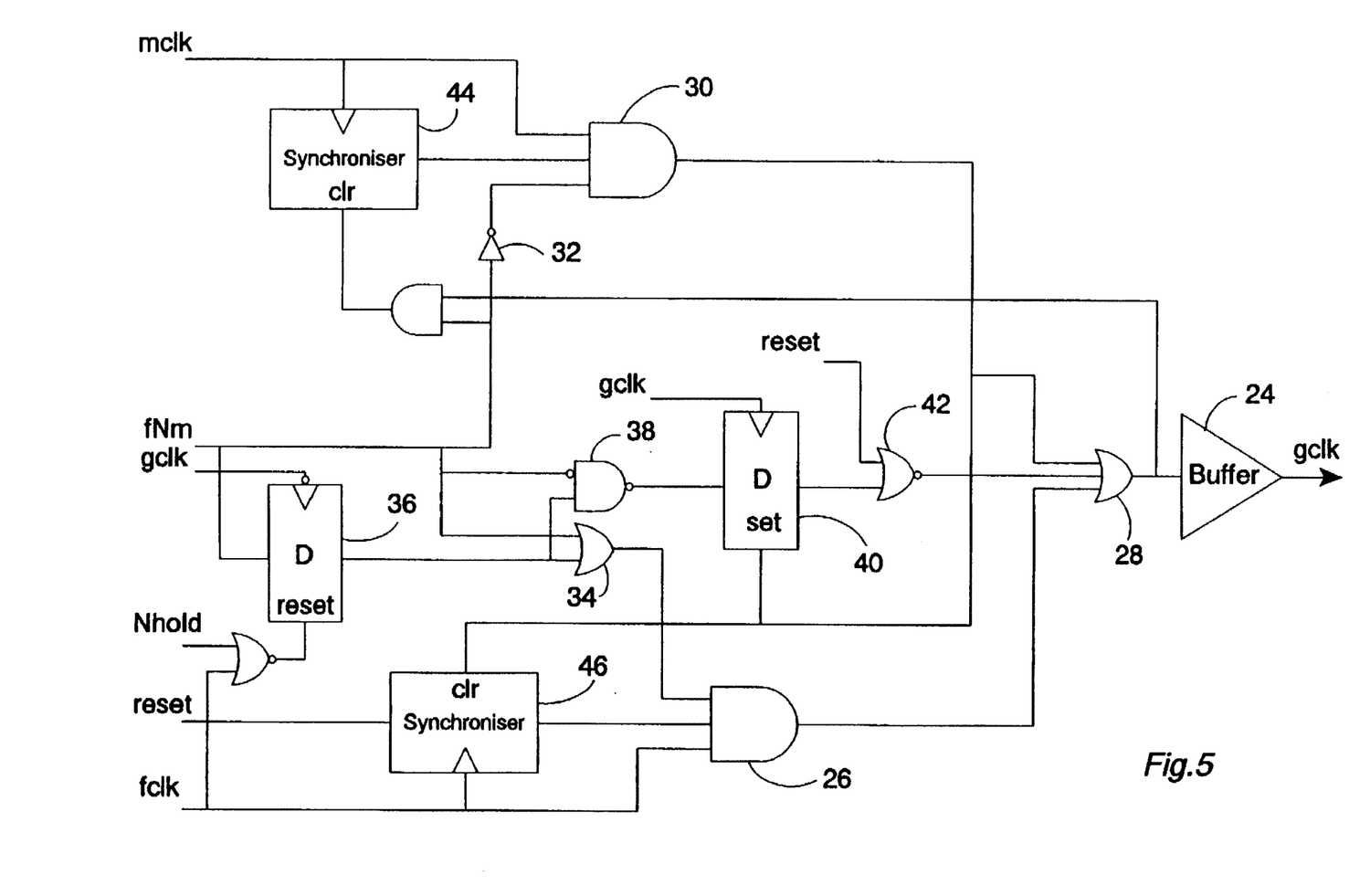
FIG. 5 illustrates a circuit for controlling the switching operations illustrated in FIG. 4.

FIG. 5 schematically illustrates a circuit for controlling the operation illustrated in FIG. 4. The circuit receives as inputs a first clock signal fclk and a second clock signal mclk. The circuit outputs a composite clock signal gclk from a power amplifying buffer 24.

The first clock signal fclk is gated by a three-input AND-gate 26 prior to being passed via a three-input OR-gate 28 to the buffer 24. In a similar way, the second clock signal mclk is gated by a three-input AND-gate 30 prior to being passed via the OR-gate 28 to the buffer 24. A control signal fNm from the control logic 12 illustrated in FIG. 1 indicates which clock is to be selected. This control signal fNm is fed via an inverter 32 to an input of the AND-gate 30 to prevent the second clock signal mclk being passed when the control signal fNm is high. Similarly, the control signal fNm passes via a two-input OR-gate 34 to an input of the AND-gate 26 to prevent the first clock signal fclk being passed by the AND-gate 26 when the control signal fNm is low. The AND-gate 26 will also pass the first clock signal fclk when the control signal fNm is low if the control signal was high on the last cycle, as stored within a D-type latch 36.

The D-type latch 36 is gated by the composite clock signal gclk and serves to latch the value of the control signal fNm. The output of the latch 36 is fed to a non-inverting input of a NAND-gate 38. An inverting input of the NAND-gate 38 is taken directly from the control signal fNm. In this way, when the control signal fNm transitions from a high value to a low value, the non-inverting input to the NAND-gate 38 will be high and the inverting input to the NAND-gate 38 will be low causing the output from the NAND-gate 38 to change from high to low.

The output from the NAND-gate 38 is latched in a D-type latch 40. The output of the latch 40 passes through a NOR-gate 42 to generate the high hold signal illustrated in FIG. 4. The output of the NOR-gate 42 is the signal Nhold that is fed back to the latch 36 to reset the latch 36 once the Nhold signal has gone low.

A synchronizer 44 serves to enable the passing of the second clock signal mclk through the AND-gate 30 only when a valid clock occurs, i.e. in this case on a falling edge of the second clock signal mclk after a rising edge of the second clock signal mclk has been encountered. The synchronizer 44 is reset when the fast clock is running.

A complementary synchronizer 46 serves to enable the first clock signal fclk through the AND-gate 26 only when the first valid rising edge of the first clock signal fclk is detected (e.g. not too short a clock pulse). The synchronizer 46 is reset when the second clock signal mclk is selected.

Figure 6:
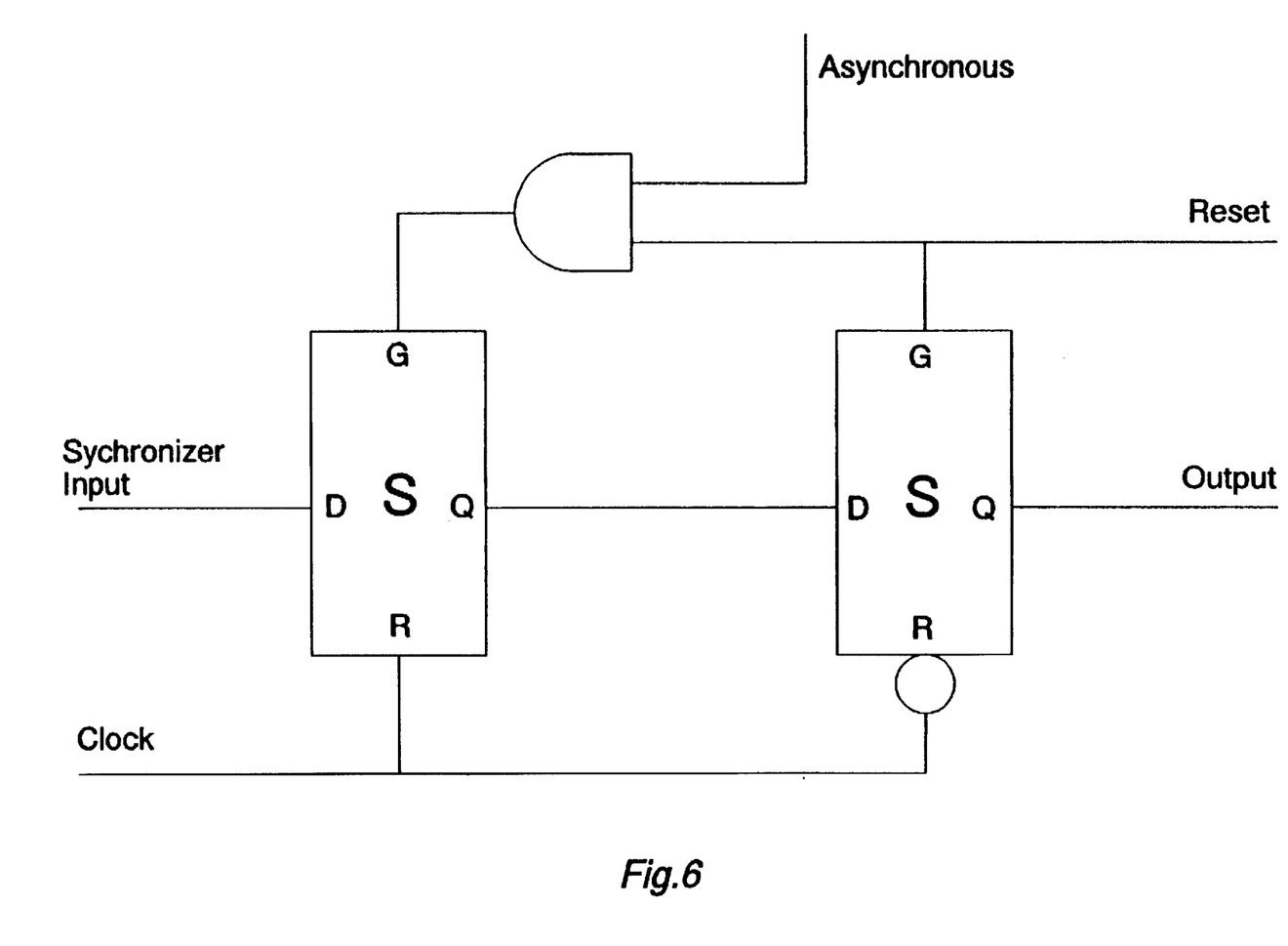
FIG. 6 illustrates the synchronizer element of FIG. 5 in more detail.

FIG. 6 shows the synchronizers 44 and 46 in more detail. The synchronizer can operate in an asynchronous mode (Asynchronous signal high) and a synchronous mode (Asynchronous signal low).

In the asynchronous mode, after both latches are reset by a clock pulse from the other clock applied on the reset line and passed by the AND gate since the Asynchronous signal is high. After this reset, the intermediate signal between the two latches will go high if the input to the first latch is high and the clock input is high. When the clock input then falls, the second latch will pass the high signal and the output will be high. The circuit is reset when a pulse is generated from the other clock (i.e. the one not being gated by this synchronizer). The action of this synchronizer is to set the output signal high during the first valid low phase of the clock being gated following a high phase of the other clock. The synchronizer operates continuously in this manner and if a switchover is occurring then this is selected by the fNm signal, otherwise the synchronizer will just be reset again by a clock pulse from the other clock, this may even be before the output is set.

In the synchronous mode of operation of the synchronizer, there is a defined relationship between the two clocks and so there is no need to look for the high phase of the clocks. Since the Asynchronous signal is low, the AND gate is blocked and the first latch is never reset with the output being set when the clock input is low. This reduces the switchover time when the phase relationship of the two clocks is known.

Figure 7:
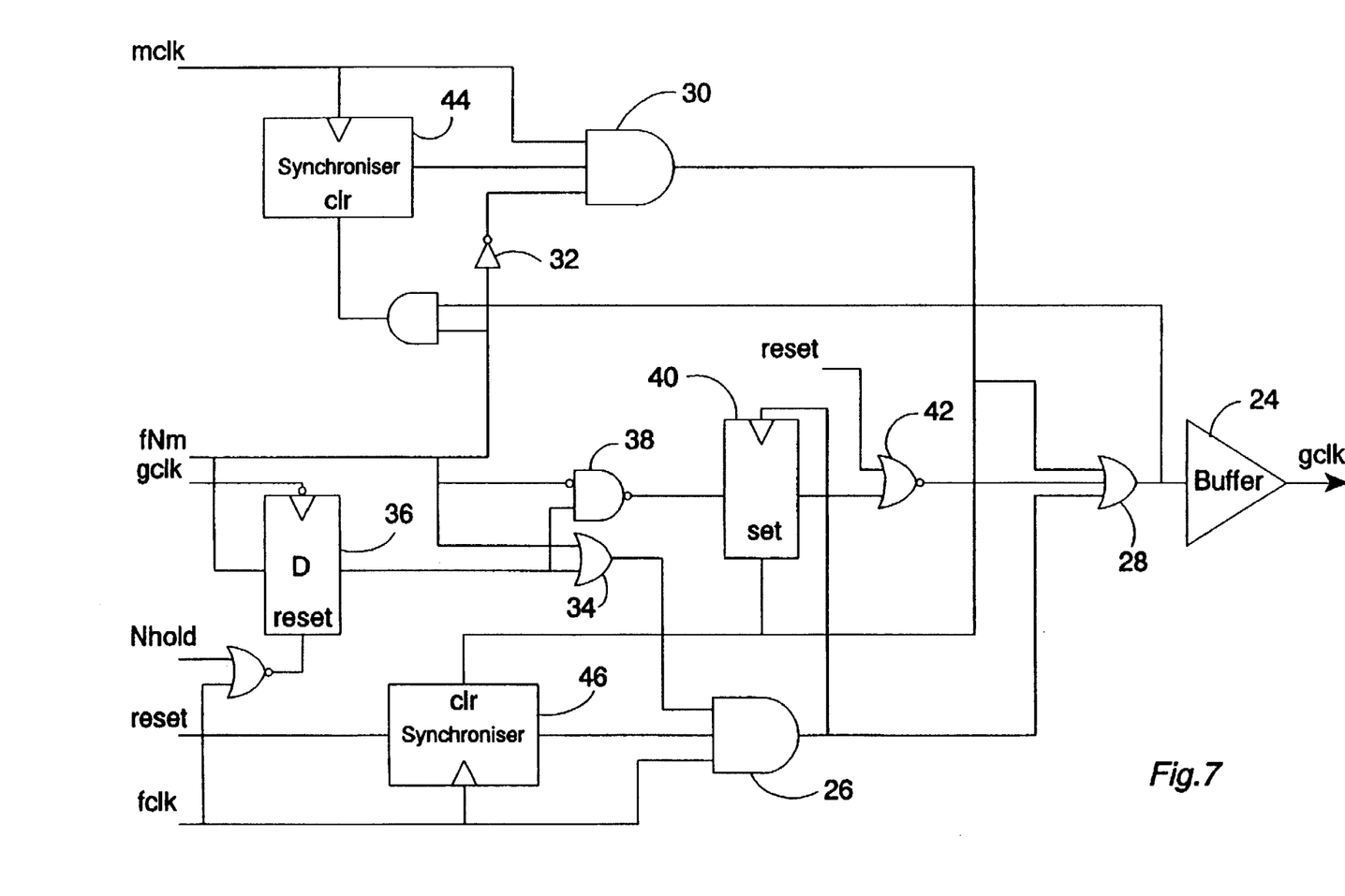
FIG. 7 illustrates a modified version of the circuit of FIG. 5.

FIG. 7 illustrates a modified version of the circuit of FIG. 5. In this modification, the D-type latch 40 is changed to a transparent latch 40 that is enabled by the output of the three-input AND-gate 26 rather than being edge triggered by the composite clock gclk. This enables a more rapid switch from the first clock signal fclk to the second clock signal mclk where appropriate.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
   (i) a central processing unit core;
   (ii) a cache memory coupled to said central processing unit core
   (iii) means for receiving a first clock signal changing between a first signal level and a second signal level at a first clock signal frequency, said first clock signal having a first clock signal period;
   (iv) means for receiving a second clock signal changing between said first signal level and said second signal level at a second clock signal frequency, said second clock signal frequency being lower than said first clock signal frequency and said first clock signal and said second clock signal being asynchronous having no fixed phase relationship therebetween;
   (v) a clock signal selecting means for performing a clock switching cycle to switch selection of an output clock signal between said first clock signal and said second clock signal, said clock switching cycle starting from a change in said output clock signal from said first signal level to said second signal level;
   (vi) processing logic driven by said output clock signal for performing a determination as to whether a cache miss has occurred such that said clock signal selecting means should effect a clock switch within a current clock switching cycle, said determination commencing with said current clock switching cycle and said processing logic taking a time greater than one half of the first clock signal period to determine whether said clock switch should take place; wherein
   (vii) when switching from said first clock signal to said second clock signal, said output clock signal synchronizes to said second clock signal from a time at which said second clock signal changes from said first signal level to said second signal level;
   (viii) when switching from said second clock signal to said first clock signal, said output clock signal synchronizes to said first clock signal from a time at which said first clock signal changes from said second signal level to said first signal level; and
   (ix) when switching from said first clock signal to said second clock signal, after starting said current clock selecting cycle, said clock signal selecting means controls said output clock signal to change from said second signal level to said first signal level at substantially the same time as said first clock signal prior to synchronizing to said second clock signal, and generates a hold signal to then maintain said first signal level as said output clock signal for a minimum time of one half of said first clock signal period.

2. Apparatus as claimed in claim 1, wherein when switching from said second clock signal to said first clock signal after starting said current clock selecting cycle, said clock signal selecting means controls said output clock signal to maintain said second signal level until synchronized to said first clock signal.

3. Apparatus as claimed in claim 2, wherein said clock signal selecting means controls said output clock signal to maintain said second signal level for a minimum time of one half of said first clock signal period.

4. Apparatus as claimed in claim 1 wherein said second clock signal is selected and synchronized to when a cache miss occurs causing an external memory access to be made.

5. Apparatus as claimed in claim 1, wherein said first signal level is a high signal level and said second signal level is a low signal level.

6. Apparatus as claimed in claim 1, comprising a buffer circuit for power amplifying said output clock signal prior to supplying said output clock signal to said processing logic.

7. A method of processing data within apparatus for processing data having a central processing unit core and a cache memory coupled to said control processing unit core, said method comprising the steps of:

(i) generating a first clock signal changing between a first signal level and a second signal level at a first clock signal frequency, said first clock signal having a first clock signal period, (ii) generating a second clock signal changing between said first signal level and said second level at a second clock signal frequency, said second clock signal frequency being lower than said first clock signal frequency and said first clock signal and said second clock signal being asynchronous having no fixed phase relationship therebetween;

(iii) performing a clock switching cycle to switch selection of an output clock signal between said first clock signal and said second clock signal, said clock switching cycle starting from a change in said output clock signal from said first signal level to said second signal level; and (iv) performing a determination with processing logic driven by said output clock signal as to whether a cache miss has occurred such that said clock signal selecting means should effect a clock switch within a current clock switching cycle, said determination commencing with said current clock switching cycle and said processing logic taking a time greater than one half of the first clock signal period to determine whether said clock switch should take place; wherein (v) when switching from said first clock signal to said second clock signal, said output clock signal synchronizes to said second clock signal from a time at which said second clock changes from said first signal level to said second signal level;

(vi) when switching from said second clock signal to said first clock signal, said output clock signal synchronizes to said first clock signal from a time at which said first clock signal changes from said second signal level to said first signal level; and (vii) when switching from said first clock signal to said second clock signal, after starting said current clock selecting cycle, controlling said output clock signal to change from said second signal level to said first signal level at substantially the same time as said first clock signal prior to synchronizing to said second clock signal, and generating a hold signal to then maintain said first signal level as said output clock signal for a minimum time of one half of said first clock signal period.

* * * * *